United States Patent
Bu

(10) Patent No.: US 9,760,454 B2
(45) Date of Patent: Sep. 12, 2017

(54) HIGH AVAILABILITY METHOD AND SYSTEM FOR IMPROVING THE UTILITY OF PHYSICAL SERVERS IN CLOUD COMPUTING RESOURCE POOL

(71) Applicant: ZTE CORPORATION, Shenzhen, Guangdong Province (CN)

(72) Inventor: Jixian Bu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 105 days.

(21) Appl. No.: 14/442,787

(22) PCT Filed: Aug. 27, 2013

(86) PCT No.: PCT/CN2013/082383
§ 371 (c)(1),
(2) Date: May 14, 2015

(87) PCT Pub. No.: WO2014/089990
PCT Pub. Date: Jun. 19, 2014

(65) Prior Publication Data
US 2015/0293823 A1   Oct. 15, 2015

(30) Foreign Application Priority Data
Dec. 14, 2012 (CN) .......................... 2012 1 0541413

(51) Int. Cl.
*G06F 11/00* (2006.01)
*G06F 11/20* (2006.01)
(Continued)

(52) U.S. Cl.
CPC ...... *G06F 11/2033* (2013.01); *G06F 9/45558* (2013.01); *G06F 9/4856* (2013.01);
(Continued)

(58) Field of Classification Search
CPC .. G06F 11/2033; G06F 9/5077; G06F 9/4856; G06F 9/45558; G06F 2201/805;
(Continued)

(56) References Cited

U.S. PATENT DOCUMENTS 7,124,320 B1   10/2006  Wipfel
9,323,628 B2 *  4/2016  Ngo .................... H04L 67/1008
(Continued)

FOREIGN PATENT DOCUMENTS

CN   102035662 A   4/2011
CN   102325192 A   1/2012
(Continued)

OTHER PUBLICATIONS

XP007912868; Resource Management with VMware DRS; VMware Infrastructure.

*Primary Examiner* — Yair Leibovich
(74) *Attorney, Agent, or Firm* — Ling Wu; Stephen Yang; Ling and Yang Intellectual Property

(57) ABSTRACT

A high availability method and system for improving utilization of physical servers in a cloud computing resource pool, wherein the method includes: when the physical servers in the cloud computing resource pool fail, judging whether idle memory on the normally-running physical servers can support running of virtual machines on all the failed physical servers; when the idle memory on the normally-running physical servers can support the running of the virtual machines on all the failed physical servers, restarting the virtual machines on all the failed physical servers on the normally-running physical servers. The embodiments of the present document improve the utilization of memory resource of physical servers.

10 Claims, 1 Drawing Sheet

(51) Int. Cl.

| | |
|---|---|
| *H04L 12/26* | (2006.01) |
| *H04L 12/24* | (2006.01) |
| *G06F 9/455* | (2006.01) |
| *H04L 29/08* | (2006.01) |
| *G06F 9/48* | (2006.01) |
| *G06F 9/50* | (2006.01) |
| *H04L 29/14* | (2006.01) |

(52) U.S. Cl.
CPC ........ *G06F 9/5077* (2013.01); *H04L 41/0663* (2013.01); *H04L 41/0816* (2013.01); *H04L 43/0817* (2013.01); *H04L 67/10* (2013.01); *G06F 2009/45583* (2013.01); *G06F 2201/805* (2013.01); *G06F 2201/815* (2013.01); *H04L 67/1097* (2013.01); *H04L 69/40* (2013.01)

(58) Field of Classification Search
CPC ..... G06F 2009/45583; G06F 2201/815; H04L 67/10; H04L 43/0817; H04L 67/1097; H04L 41/0816; H04L 41/0663; H04L 69/40
USPC ....................................................... 714/4.11
See application file for complete search history.

(56) References Cited

U.S. PATENT DOCUMENTS

| | | | |
|---|---|---|---|
| 9,547,520 B1* | 1/2017 | Bailey | G06F 9/45558 |
| 9,575,793 B1* | 2/2017 | Allen | G06F 9/45558 |
| 2010/0070784 A1 | 3/2010 | Gupta et al. | |
| 2012/0226866 A1* | 9/2012 | Bozek | G06F 9/45558 711/122 |
| 2013/0185667 A1* | 7/2013 | Harper | G06F 11/0709 715/772 |
| 2017/0039083 A1* | 2/2017 | Kitano | G06F 9/45558 |

FOREIGN PATENT DOCUMENTS

| | | |
|---|---|---|
| CN | 102821158 A | 12/2012 |
| EP | 2306315 A1 | 4/2011 |

\* cited by examiner

HIGH AVAILABILITY METHOD AND SYSTEM FOR IMPROVING THE UTILITY OF PHYSICAL SERVERS IN CLOUD COMPUTING RESOURCE POOL

TECHNICAL FIELD

The present document relates to the technology of ensuring high availability (HA) of physical servers in a cloud computing resource pool, and particularly, to a HA method and system for improving the utilization of physical servers in a cloud computing resource pool.

BACKGROUND OF THE RELATED ART

As a computing way with expansibility and flexibility, cloud computing has obvious advantages over the traditional IT environment. With the vigorous promotion of the cloud computing concept and technology in recent years, more and more enterprises have begun to use a cloud computing system instead of the traditional IT system, wherein a private cloud deployed internally by small and medium-sized enterprises is included. Use of cloud computing can implement allocation of resource scheduling as required and automatic deploy of the environment, reducing artificial running and maintenance cost, decreasing potential errors, improving production efficiency, and realizing energy conservation and emission reduction, thereby building green IT.

A basic usage scenario of cloud computing is that a plurality of physical servers with the same architecture constitute a resource pool, and these physical servers are virtualized, thereby forming more virtual machines. To avoid failure of one or a plurality of physical servers, the resource pool is supplied with HA mechanism, guaranteeing that the service can be recovered automatically after the failure of the physical server(s).

At present, the HA mechanism of the servers in the resource pool is that: if one or a plurality of physical servers in the resource pool fail, the virtual machines running on the failed physical server(s) are restarted on other physical server(s). In order to guarantee that other normally-running physical servers have enough memory to take over all the virtual machines after part of the physical servers fails, and for all the physical servers, part of their memory will be retained not to be allocated.

Memory is an important choke point of the number of virtual machines supported by the physical servers. If the present HA policy is applied, there is serious waste of memory resources of the physical servers. In the case that the quantity of the physical servers in the resource pool is small, the waste problem is more prominent. For instance, when there are only two physical servers in one resource pool, each physical server can only allocate half available memory to the virtual machines in order to configure HA, and then the waste of memory is up to 50%. It can be considered that the existing mechanism guaranteeing the HA of physical servers implements the robustness of service at the expense of the valued memory.

SUMMARY

The present document provides a HA method and system for improving utilization of physical servers in a cloud computing resource pool to solve the technical problem of how to improve the memory resource utilization of the physical servers in the HA mechanism.

To solve the above technical problem, the present document provides a high availability (HA) method for improving utilization of physical servers in a cloud computing resource pool, the method comprises:

when the physical servers in the cloud computing resource pool fail, judging whether idle memory of the normally-running physical servers can support running of virtual machines on all the failed physical servers; when the idle memory of the normally-running physical servers can support the running of the virtual machines on all the failed physical servers, restarting the virtual machines on all the failed physical servers on the normally-running physical servers.

Preferably, the method comprises:

when the physical servers in the cloud computing resource pool fail, judging whether the idle memory of the normally-running physical servers can support the running of the virtual machines on all the failed physical servers with reserved memory, and when the idle memory of the normally-running physical servers can support the running of the virtual machines on all the failed physical servers with the reserved memory, restarting the virtual machines on all the failed physical servers on the normally-running physical servers with the reserved memory.

Preferably, the method further comprises:

when the idle memory of the normally-running physical servers can not support the running of the virtual machines on all the failed physical servers, decreasing the memory occupied by the virtual machines on the normally-running physical servers, and sequentially using the decrease of the memory as the idle memory.

Preferably, said decreasing the memory occupied by the virtual machines on the normally-running physical servers comprises:

decreasing the memory occupied by the virtual machines with a memory retention rate being zero configured on the normally-running physical servers, and/or, decreasing the memory occupied by the virtual machines with the memory retention rate being less than 1 and greater than 0 configured on the normally-running physical servers.

Preferably, said decreasing the memory occupied by the virtual machines with a memory retention rate being zero configured on the normally-running physical servers comprises:

closing the virtual machines with the memory retention rate being zero configured on the normally-running physical servers;

said decreasing the memory occupied by the virtual machines with the memory retention rate being less than 1 and greater than 0 configured on the normally-running physical servers comprises:

changing the virtual machines with the memory retention rate being less than 1 and greater than 0 configured on the normally-running physical servers from running with occupying configured memory to running with occupying reserved memory.

Preferably, the method further comprises:

when the failed physical servers return to normal, running, with the configured memory, the virtual machines not running and configured with the reserved memory of 0 on the physical servers returning to normal; and/or, transferring the virtual machines running with the reserved memory with the memory retention rate being less than 1 to the physical servers returning to normal, and running the transferred virtual machines with the configured memory.

To solve the above technical problem, the present document further provides a high availability (HA) system for improving utilization of physical servers in a cloud computing resource pool, the system comprising: a judgment module and a virtual machine restarting module, wherein, the judgment module is configured to: when the physical servers in the cloud computing resource pool fail, judge whether idle memory of the normally-running physical servers can support running of virtual machines on all the failed physical servers, and inform the virtual machine restarting module of a judgment result;

the virtual machine restarting module is configured to: when acquiring from the judgment module that the judgment result is that the idle memory of the normally-running physical servers can support the running of the virtual machines on all the failed physical servers, restart the virtual machines on all the failed physical servers on the normally-running physical servers.

Preferably, the system comprises:

the judgment module is configured to: when the physical servers in the cloud computing resource pool fail, judge whether the idle memory of the normally-running physical servers can support the running of the virtual machines on all the failed physical servers with reserved memory;

the virtual machine restarting module is configured to: when acquiring from the judgment module that the judgment result is that the idle memory of the normally-running physical servers can support the running of the virtual machines on all the failed physical servers with the reserved memory, restart the virtual machines on all the failed physical servers on the normally-running physical servers with the reserved memory.

Preferably, the virtual machine restarting module is further configured to: when acquiring from the judgment module that the judgment result is that the idle memory of the normally-running physical servers can not support the running of the virtual machines on all the failed physical servers, decrease the memory occupied by the virtual machines on the normally-running physical servers, and sequentially use the decrease of the memory as the idle memory.

Preferably, the virtual machine restarting module being configured to decrease the memory occupied by the virtual machines on the normally-running physical servers, comprises:

the virtual machine restarting module decreasing the memory occupied by the virtual machines with a memory retention rate being zero configured on the normally-running physical servers, and/or, decreasing the memory occupied by the virtual machines with the memory retention rate being less than 1 and greater than 0 configured on the normally-running physical servers.

Preferably, the virtual machine restarting module being configured to decrease the memory occupied by the virtual machines with a memory retention rate being zero configured on the normally-running physical servers, comprises:

the virtual machine restarting module closing the virtual machines with the memory retention rate being zero configured on the normally-running physical servers;

the virtual restarting module being configured to decrease the memory occupied by the virtual machines with the memory retention rate being less than 1 and greater than 0 configured on the normally-running physical servers, comprises:

the virtual machine restarting module changing the virtual machines with the memory retention rate being less than 1 and greater than 0 configured on the normally-running physical servers from running with occupying configured memory to running with occupying reserved memory.

Preferably, the virtual restarting module is further configured to: when the failed physical servers return to normal, run, with the configured memory, the virtual machines not running and configured with the reserved memory of 0 on the physical servers returning to normal; and/or, transfer the virtual machines running with the reserved memory with the memory retention rate being less than 1 to the physical servers returning to normal, and run the transferred virtual machines with the configured memory.

In the above technical solution, part of memory is no longer reserved in advance for the physical servers in the cloud computing resource pool, but when the physical servers in the cloud computing resource pool fail, whether the normally-running physical servers have enough idle memory for HA mechanism is calculated, and the idle memory is used directly to start the virtual machines on the failed physical servers in the case that there is enough idle memory for the HA mechanism. Since part of memory is no longer reserved in advance for the physical servers in the cloud computing resource pool, the problem of low utilization of memory resource induced by reserving memory is avoided.

PREFERRED EMBODIMENTS OF THE INVENTION

Figure 1:
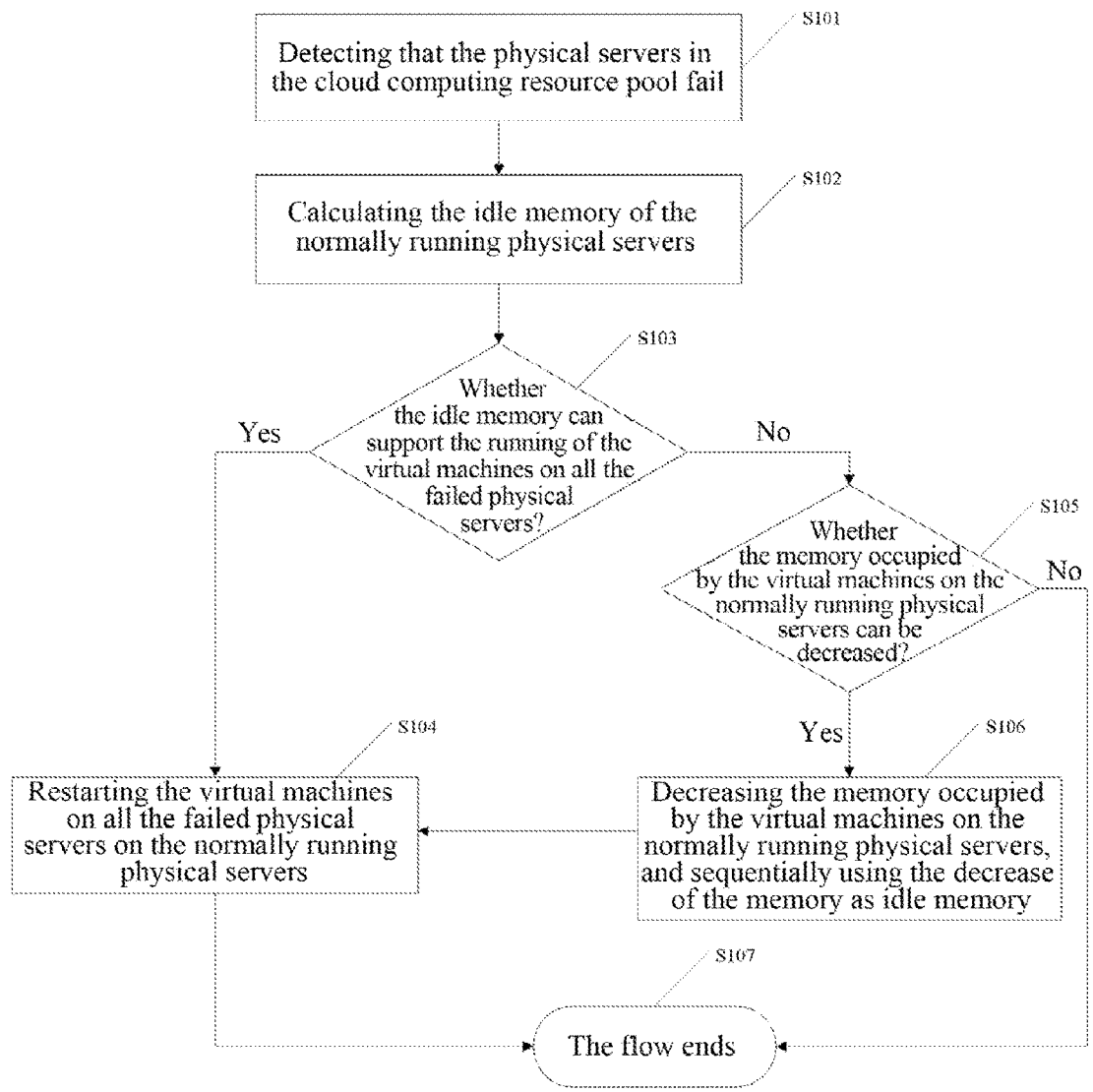
FIG. 1 is a flow chart of an HA method for improving the utilization of physical servers in a cloud computing resource pool according to the embodiment of the present document.

The embodiments of the present document will be expounded in combination with the accompanying drawings as below. It needs to explain that the embodiments and the features of the embodiments in the present application may be combined with one another in any way without confliction.

Before the embodiments of the present document are described, the technical terms used in the embodiments are described briefly here:

configured memory: the memory allocated for virtual machines when the virtual machines are created on physical servers, which is the memory necessary for efficient running of the virtual machines; when no physical server fails in the resource pool, the virtual machines run with configured memory;

reserved memory: the minimum memory necessary for the running of a virtual machine, the value of which is usually smaller than or equal to the configured memory; particularly, the reserved memory of a virtual machine may be configured to be zero, indicating that the virtual machine is allowed to be powered off directly;

saved memory: the value of the configured memory minus the reserved memory, which is greater than or equal to zero;

memory retention rate: the reserved memory is divided by the configured memory, with two digits after the decimal point effective;

parameter indicating whether the reserved memory is valid: this parameter is used to indicate whether to start the HA policy based on the reserved memory; when the parameter is 1, it indicates to start, and when the parameter is 0, it indicates not to start.

To implement the HA policy, it is required to configure the resource pool and the virtual machines in the resource pool, and the configuration process is as follows:

Firstly, when a resource pool is created, the corresponding parameters in resource pool configuration files are set as defaults:
the parameter indicating whether the reserved memory is valid is set as the default of 0, indicating that the HA policy of the reserved memory is not enabled;
the size of the reserved memory of the virtual machines is set to be the same as the size of the configured memory;
the saved memory of the virtual machines is set as the default of 1.

Secondly, the relevant parameters in the configuration files of each virtual machine in the resource pool are set as defaults:
the size of the reserved memory of the virtual machines is set to be the same as the size of the configured memory;
the saved memory of the virtual machines is set as the default of 0;
the memory retention rate of the virtual machines is set as the default of 1.

Thirdly, HA configuration is performed for the resource pool;
whether the memory retention rate of the virtual machines is configured to take effect:
if the memory retention rate is configured to not take effect, the reserved memory configuration of each virtual machine is shielded; if the memory retention rate is configured to take effect, the reserved memory is continued to configure for each virtual machine.

Fourthly, in the case that the memory retention rate of the virtual machine is configured to take effect in the third step, the reserved memory size is configured for each virtual machine, and the configuration range is smaller than or equal to the configured memory, and is greater than or equal to the minimum memory required by a virtual machine operation system; or it is configured as 0.

Fifthly, the number of the physical servers allowed to fail is configured; the configuration range is greater than or equal to 1, and is smaller than the total number of all the physical servers in the resource pool.

Sixthly, the HA configuration is submitted.

After the HA module of the system receives the HA configuration, the available memory size of the remaining physical servers when an allowed quantity of the physical servers fail is first calculated: in the case that the memory size of each physical server in the resource pool is the same, the quantity of the physical servers allowed to fail is directly subtracted, and the total memory size of the remaining physical servers namely is the available memory size of the remaining physical servers required to be calculated; in the case that the memory size of each physical server in the resource pool is not same, the physical servers with big memory are subtracted, and the total memory size of the remaining physical servers namely is the available memory size of the remaining physical servers required to be calculated;

and then the minimum size of the memory required by all the virtual machines is calculated; the result from adding the size of reserved memory configured for each virtual machine namely is the minimum size of the memory required by the virtual machines;

finally, the available memory size of the remaining physical servers is compared with the minimum size of the memory required by the virtual machines, and if the available memory size of the remaining physical servers is greater than or equal to the minimum size of the memory required by the virtual machines, the submitted HA configuration is set to be effective; otherwise, the submitted HA configuration is set to be ineffective, and an error notification is returned and reconfiguration is prompted.

The HA method and system for improving the utilization of physical servers in a cloud computing resource pool provided by the present embodiment both work in the state that the HA configuration takes effect.

FIG. 1 is the flow chart of the HA method for improving the utilization of physical servers in a cloud computing resource pool according to the present embodiment.

In S101, it is to detect that the physical servers in the cloud computing resource pool fail;
in other embodiments, when detecting that the physical servers in the cloud computing resource pool fail, it may be further judged whether the quantity of the failed physical servers is within the range of the quantity of the failed physical servers allowed for the running of the HA policy, and if it is within the range, the following steps are proceeded; otherwise, an alarm is sent;
in S102, it is to calculate the idle memory of the normally-running physical servers;
in S103, it is to judge whether the idle memory can support the running of the virtual machines on all the failed physical servers, and if it can support, step S104 is executed; otherwise, step S105 is executed;
in order to decrease the memory space occupied when the virtual machines are restarted, in this step it may be judged whether the idle memory can support the running of the virtual machines on all the failed physical servers with reserved memory;
in S104, it is to restart the virtual machines on all the failed physical servers on the normally-running physical servers, and step S107 is executed;
if the virtual machines on all the failed physical servers are restarted with reserved memory on the normally-running physical servers, it means that the virtual machines with reserved memory of zero configured on the failed physical servers are no longer restarted on the normally running physical servers; this not only further decreases the memory space occupied when the virtual machines are restarted but also may give priority to ensure important virtual machines to first use memory to perform restarting operation in the case of limited memory resource;
in S105, it is to judge whether the memory occupied by the virtual machines on the normally-running physical servers may be decreased, and if it may be decreased, step S106 is executed; otherwise, step S107 is executed;
in S106, it is to decrease the memory occupied by the virtual machines on the normally-running physical servers, and sequentially use the decrease of the memory as idle memory, and step S104 is executed;
in consideration of the characteristics of the virtual machines configured on the physical servers, some virtual machines are required to run efficiently with configured memory, some virtual machines may stop running for a while, and some virtual machines may run with reserved memory. For this, when decreasing the memory occupied by the virtual machines on the normally-running physical servers is implemented in the present embodiment, memory is acquired from the virtual machines that may stop running for a while and the virtual machines that may run with reserved memory as idle memory, that is, decreasing the memory occupied by the virtual machines with memory retention rate being zero configured on the normally-running physical servers, and/or, decreasing the memory occupied by the virtual machines with memory retention rate being less than 1 and greater than 0 configured on the normally-running physical servers. For example, decreasing the memory occupied by the virtual machines with memory retention rate being zero configured on the normal physical servers at first, and if the increased idle memory still cannot satisfy the running of the virtual machines on all the failed physical servers, further decreasing the memory occupied by the virtual machines with memory retention rate being less than 1 and greater than zero configured on the normally-running physical servers; of course, it may also decrease the memory occupied by the virtual machines with memory retention rate being less than 1 and greater than 0 configured on the normally-running physical servers, and then decrease the memory occupied by the virtual machines with memory retention rate being zero configured on the normally-running physical servers;

the method of decreasing the memory occupied by the virtual machines with the memory retention rate being zero configured on the normally-running physical servers as above may comprise: closing the virtual machines with memory retention rate being zero configured on the normally-running physical servers; the method of decreasing the memory occupied by the virtual machines with memory retention rate being less than 1 and greater than 0 configured on the normally-running physical servers as above may comprise: changing the virtual machines with memory retention rate being less than 1 and greater than 0 configured on the normally-running physical servers from running with occupying configured memory to running with occupying reserved memory. In the present embodiment, different methods of decreasing memory are adopted for the virtual machines configured with different memory retention rates, thereby reducing adverse effect on the services operating on the normally-running physical servers due to the decrease of memory;

in S107, the flow ends.

In the above embodiment, when the failed physical servers return to normal, the virtual machines configured with reserved memory of zero may run with configured memory on the physical servers returning to normal; and/or, the virtual machines with memory retention rate being less than 1 that are running with reserved memory are transferred to the physical servers returning to normal, and the transferred virtual machines are ran with configured memory, so as to take full advantage of memory resources of the physical servers. For example, when the failed physical servers return to normal, if it is found that there are virtual machines configured with reserved memory of zero that do not run, then the virtual machines are ran with configured memory on the physical servers returning to normal; if there is still idle memory on the physical servers returning to normal after all the virtual machines configured with reserved memory of zero are started, the virtual machines with memory retention rate being less than 1 that are running with reserved memory are transferred to the physical servers returning to normal, and the transferred virtual machines are ran with configured memory.

Figure 2:
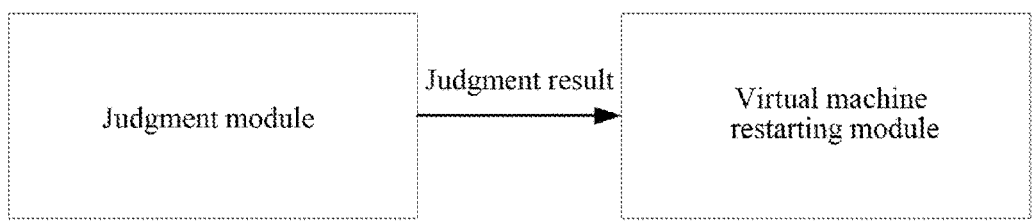
FIG. 2 is a composition diagram of an HA system for improving the utilization of physical servers in a cloud computing resource pool according to the embodiment of the present document.

FIG. 2 is the composition diagram of the HA system for improving the utilization of physical servers in a cloud computing resource pool according to the present embodiment.

The system comprises a judgment module and a virtual machine restarting module, wherein, the judgment module is configured to, when the physical servers in the cloud computing resource pool fail, judge whether idle memory of the normally-running physical servers can support running of virtual machines on all the failed physical servers, and inform the virtual machine restarting module of a judgment result;

the virtual machine restarting module is configured to, when acquiring from the judgment module that the judgment result is that the idle memory of the normally-running physical servers can support the running of the virtual machines on all the failed physical servers, restart the virtual machines on all the failed physical servers on the normally-running physical servers.

To decrease the memory space occupied when the virtual machines are restarted, the virtual machines to be restarted can run only with reserved memory, and at the moment, the judgment module is required to judge whether the idle memory of the normally-running physical servers can support the running of the virtual machines on all the failed physical servers with reserved memory when the physical servers in the cloud computing resource pool fail; the virtual machine restarting module is required to, when acquiring from the judgment module that the judgment result is that the idle memory of the normally-running physical servers can support the running of the virtual machines on all the failed physical servers with reserved memory, restart the virtual machines on all the failed physical servers on the normally-running physical servers with reserved memory.

In the above embodiment, the virtual machine restarting module is further used to, when acquiring from the judgment module that the judgment result is the idle memory of the normally-running physical servers cannot support the virtual machines on all the failed physical servers, decrease the memory occupied by the virtual machines on the normally-running physical servers, and then sequentially use the decrease of the memory as idle memory;

wherein, the method of the virtual machine restarting module used to decrease the memory occupied by the virtual machines on the normally-running physical servers comprises: decreasing the memory occupied by the virtual machines with memory retention rate being zero configured on the normally-running physical servers, and/or, decreasing the memory occupied by the virtual machines with memory retention rate being less than 1 and greater than 0 configured on the normally-running physical servers; for example, decreasing the memory occupied by the virtual machines with memory retention rate being zero configured on the normally-running physical servers at first, and if the increased idle memory still cannot satisfy the running of the virtual machines on all the failed physical servers, further decreasing the memory occupied by the virtual machines with memory retention rate being less than 1 and greater than zero configured on the normally-running physical servers; of course, it may also decrease the memory occupied by the virtual machines with memory retention rate being less than 1 and greater than 0 configured on the normally-running physical servers, and then decrease the memory occupied by the virtual machines with memory retention rate being zero configured on the normal physical servers;

the method of the virtual machine restarting module used to decrease the memory occupied by the virtual machines with memory retention rate being zero configured on the normally-running physical servers as above may comprise:

closing the virtual machines with memory retention rate being zero configured on the normally-running physical servers;

the method of the virtual machine restarting module used to decrease the memory occupied by the virtual machines with memory retention rate being smaller than 1 and larger than 0 configured on the normally-running physical servers as above may comprise: changing the virtual machines with memory retention rate being less than 1 and greater than 0 configured on the normally-running physical servers from running with occupying configured memory to running with occupying reserved memory.

In the above embodiment, the virtual machine restarting module is further used to, when the failed physical servers return to normal, run the virtual machines not running and configured with reserved memory of zero with configured memory on the physical servers returning to normal; and/or, transfer the virtual machines with memory retention rate being less than 1 that are running with reserved memory to the physical servers returning to normal, and run the transferred virtual machines with configured memory.

It should be understood by the person skilled in the art that the whole or part of the steps in the above method can be completed by means of a program instructing relevant hardwire, and the program may be stored in a computer readable storage medium, such as Read Only Memory, magnetic disk or optical disc. Optionally, the whole or part of the steps in the above embodiments can be implemented using one or more integrated circuits. Accordingly, the respective modules/units in the above embodiments can be implemented in the form of hardware or software function module. The present document is not limited to any particular combination of hardware and software.

It should be noted that the present document also have various other embodiments, and a person skilled in the art may make various variations and modifications according to the present document without departing from the spirit and essence of the present document; however, these corresponding variations and modifications should fall into the protection scope of the appended claims of the present document.

INDUSTRIAL APPLICABILITY

In the above technical solution, part of memory is no longer reserved in advance for physical servers in a cloud computing resource pool, but when the physical servers in the cloud computing resource pool fail, whether the normally-running physical servers have enough idle memory for HA mechanism is calculated, and the idle memory is used directly to start the virtual machines on the failed physical servers in the case that there is enough idle memory for the HA mechanism. Since part of memory is no longer reserved in advance for the physical servers in the cloud computing resource pool, the problem of low utilization of the memory resource induced by reserving memory is avoided.

What is claimed is:

1. A high availability (HA) method for improving utilization of physical servers in a cloud computing resource pool, wherein the method comprises:
when the physical servers in the cloud computing resource pool fail, judging whether idle memory of the normally-running physical servers can support running of virtual machines on all the failed physical servers; when the idle memory of the normally-running physical servers can support the running of the virtual machines on all the failed physical servers, restarting the virtual machines on all the failed physical servers on the normally-running physical servers; wherein the method further comprises:

when the physical servers in the cloud computing resource pool fail, judging whether the idle memory of the normally-running physical servers can support the running of the virtual machines on all the failed physical servers with reserved memory, and when the idle memory of the normally-running physical servers can support the running of the virtual machines on all the failed physical servers with the reserved memory, restarting the virtual machines on all the failed physical servers on the normally running physical servers with the reserved memory;

when the idle memory of the normally-running physical servers can not support the running of the virtual machines on all the failed physical servers, decreasing the memory occupied by the virtual machines on the normally-running physical servers, and sequentially using the decrease of the memory as the idle memory.

2. The method as claimed in claim 1, wherein said decreasing the memory occupied by the virtual machines on the normally-running physical servers comprises:
decreasing the memory occupied by the virtual machines with a memory retention rate being 0 configured on the normally-running physical servers, and/or, decreasing the memory occupied by the virtual machines with the memory retention rate being less than 1 and greater than 0 configured on the normally-running physical servers.

3. The method as claimed in claim 2, wherein,
said decreasing the memory occupied by the virtual machines with a memory retention rate being 0 configured on the normally-running physical servers comprises:
closing the virtual machines with the memory retention rate being 0 configured on the normally-running physical servers;
said decreasing the memory occupied by the virtual machines with the memory retention rate being less than 1 and greater than 0 configured on the normally-running physical servers comprises:
changing the virtual machines with the memory retention rate being less than 1 and greater than 0 configured on the normally-running physical servers from running with occupying configured memory to running with occupying reserved memory.

4. The method as claimed in claim 3, wherein, the method further comprises:
when the failed physical servers return to normal, running, with the configured memory, the virtual machines not running and configured with the reserved memory being 0 on the physical servers returning to normal; and/or, transferring the virtual machines running with the reserved memory with the memory retention rate being less than 1 to the physical servers returning to normal, and running the transferred virtual machines with the configured memory.

5. The method as claimed in claim 2, wherein, the method further comprises:
when the failed physical servers return to normal, running, with the configured memory, the virtual machines not running and configured with the reserved memory being 0 on the physical servers returning to normal; and/or, transferring the virtual machines running with the reserved memory with the memory retention rate being less than 1 to the physical servers returning to normal, and running the transferred virtual machines with the configured memory.

6. A high availability (HA) system for improving utilization of physical servers in a cloud computing resource pool, wherein the system comprises hardware performing instructions stored in a non-transitory computer readable medium which executes steps in following modules: a judgment module and a virtual machine restarting module, wherein, the judgment module is configured to: when the physical servers in the cloud computing resource pool fail, judge whether idle memory of the normally-running physical servers can support running of virtual machines on all the failed physical servers, and inform the virtual machine restarting module of a judgment result;

the virtual machine restarting module is configured to: when acquiring from the judgment module that the judgment result is that the idle memory of the normally-running physical servers can support the running of the virtual machines on all the failed physical servers, restart the virtual machines on all the failed physical servers on the normally-running physical servers;

wherein, the system further comprises:

the judgment module is configured to: when the physical servers in the cloud computing resource pool fail, judge whether the idle memory of the normally-running physical servers can support the running of the virtual machines on all the failed physical servers with reserved memory;

the virtual machine restarting module is configured to: when acquiring from the judgment module that the judgment result is that the idle memory of the normally-running physical servers can support the running of the virtual machines on all the failed physical servers with the reserved memory, restart the virtual machines on all the failed physical servers on the normally-running physical servers with the reserved memory;

the virtual machine restarting module is further configured to: when acquiring from the judgment module that the judgment result is that the idle memory of the normally-running physical servers can not support the running of the virtual machines on all the failed physical servers, decrease the memory occupied by the virtual machines on the normally-running physical servers, and sequentially use the decrease of the memory as the idle memory.

7. The system as claimed in claim 6, wherein, the virtual machine restarting module being configured to decrease the memory occupied by the virtual machines on the normally-running physical servers, comprises:

the virtual machine restarting module decreasing the memory occupied by the virtual machines with a memory retention rate being 0 configured on the normally-running physical servers, and/or, decreasing the memory occupied by the virtual machines with the memory retention rate being less than 1 and greater than 0 configured on the normally-running physical servers.

8. The system as claimed in claim 7, wherein, the virtual machine restarting module being configured to decrease the memory occupied by the virtual machines with a memory retention rate being 0 configured on the normally-running physical servers, comprises:

the virtual machine restarting module closing the virtual machines with the memory retention rate being 0 configured on the normally-running physical servers;

the virtual machine restarting module being configured to decrease the memory occupied by the virtual machines with the memory retention rate being less than 1 and greater than 0 configured on the normally-running physical servers, comprises:

the virtual machine restarting module changing the virtual machines with the memory retention rate being less than 1 and greater than 0 configured on the normally-running physical servers from running with occupying configured memory to running with occupying reserved memory.

9. The system as claimed in claim 8, wherein:

the virtual machine restarting module is further configured to: when the failed physical servers return to normal, run, with the configured memory, the virtual machines not running and configured with the reserved memory being 0 on the physical servers returning to normal; and/or, transfer the virtual machines running with the reserved memory with the memory retention rate being less than 1 to the physical servers returning to normal, and run the transferred virtual machines with the configured memory.

10. The system as claimed in claim 7, wherein:

the virtual machine restarting module is further configured to: when the failed physical servers return to normal, run, with the configured memory, the virtual machines not running and configured with the reserved memory being 0 on the physical servers returning to normal; and/or, transfer the virtual machines running with the reserved memory with the memory retention rate being less than 1 to the physical servers returning to normal, and run the transferred virtual machines with the configured memory.

* * * * *